United States Patent [19]

Nishimoto

[11] Patent Number: 4,466,703

[45] Date of Patent: Aug. 21, 1984

[54] VARIABLE-FOCAL-LENGTH LENS USING AN ELECTROOPTIC EFFECT

[75] Inventor: Yoshifumi Nishimoto, Machida, Japan

[73] Assignee: Canon Kabushiki Kaisha, Tokyo, Japan

[21] Appl. No.: 359,034

[22] Filed: Mar. 17, 1982

[30] Foreign Application Priority Data

Mar. 24, 1981 [JP] Japan .................................. 56/42769
May 12, 1981 [JP] Japan .................................. 56/71231
Jun. 26, 1981 [JP] Japan ................................. 56/100013

[51] Int. Cl.³ .............................................. G02F 1/29
[52] U.S. Cl. ..................................... 350/379; 350/388; 350/393; 350/403
[58] Field of Search ................ 350/379, 388, 393, 403; 369/45

[56] References Cited

U.S. PATENT DOCUMENTS

3,239,671  3/1966  Buhrer ................................ 350/393
3,614,200 10/1971  Taylor ................................ 350/388
3,630,597 12/1971  Hulme ................................ 350/388
4,124,273 11/1978  Huignard et al. ................... 350/379

Primary Examiner—Bruce Y. Arnold
Assistant Examiner—William Propp
Attorney, Agent, or Firm—Fitzpatrick, Cella, Harper & Scinto

[57] ABSTRACT

A novel arrangement of variable-focal-length lens using an electrooptic effect is provided. A variable electric field is applied to an electrooptic crystal to produce therein a refractive index distribution having a lens action. The applied electric field is such that the intensity distribution of the lens varies along one direction in a plane normal to the direction of the light incidence but which has a uniform intensity distribution in the direction normal to this direction. A two-dimensional variable-focal-length lens is obtained by combining two such one-dimensional lenses in such manner that the two-lenses intersect each other at right angles with respect to the direction of the lens action. Also, a refractive index distribution having a two-dimensional lens action is produced to form a variable-focal-length lens when an electric field having an intensity distribution which varies within the plane normal to the direction of the incident light is applied to the electrooptic crystal.

10 Claims, 10 Drawing Figures

VARIABLE-FOCAL-LENGTH LENS USING AN ELECTROOPTIC EFFECT

BACKGROUND OF THE INVENTION

1. Field of the Invention

The present invention relates to a variable-focal-length lens and more particularly relates to a variable-focal-length lens wherein an electrooptic crystal is disposed in a slanted electric field and the lens action of the crystal is controlled by means of an electric signal.

2. Description of the Prior Art

In known optical systems of varifocal lenses, which are generally called zoom lenses, the change of the focal length is achieved by moving a selected lens group or groups along the optical axis thereby changing the distance between the lens groups. The lens system, therefore, needs to have moving mechanisms for the movement of the lens groups. However, these moving mechanisms have not satisfactorily ensured quick or high-speed changing of the focal length, and reduction in size and manufacturing cost.

As a solution for such problems, it has been proposed to make use of an electrooptic effect. In Japanese Patent Publication No. 615/1974, a variable-focal-length lens is disclosed wherein a slanted electric field is applied to an electrooptic crystal to control the lens action of the crystal by means of an electric signal. This type of variable-focal-length lens assures reduction in size and high-speed changing of the focal length.

Figure 1:
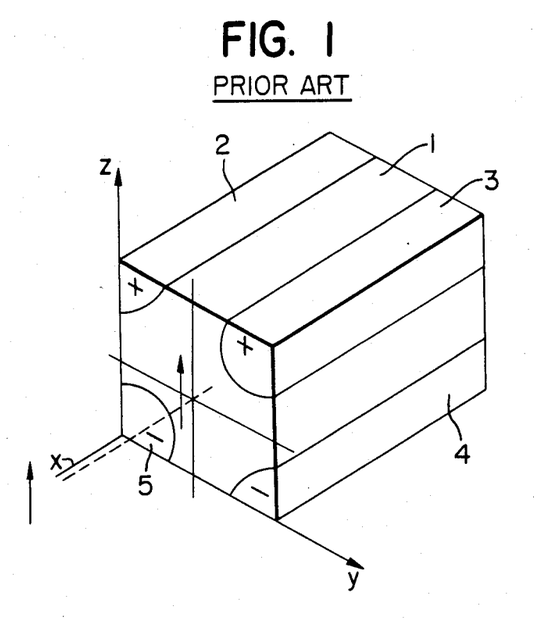
FIG. 1 is a perspective view of a variable-focal-length lens using an electrooptic crystal having cylindrical electrodes according to the prior art.
Figure 2:
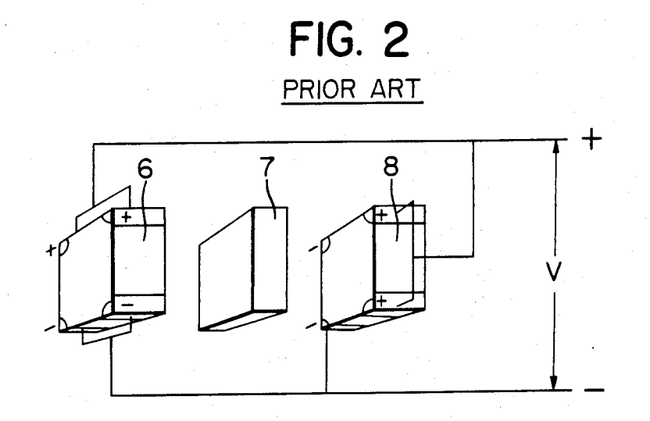
FIG. 2 is a perspective view of a two-dimensional composite lens using two variable-focal-length lenses such as shown in FIG. 1.

FIGS. 1 and 2 show such prior art. In FIG. 1, designated by 1 is an electrooptic crystal, LiTaO$_3$; and 2 to 5, are cylindrical electrodes to which an electric field is applied so that the electrodes 2 and 3 become positive and the electrodes 4 and 5 become negative. The electric field Ez in the direction of z-axis in FIG. 1 shows a particular distribution of electric field on y-axis wherein the electric field Ez is lower at and near the center of the crystal and becomes higher toward the edges of the crystal. Under these conditions, when light polarized in the direction of z-axis enters into the electrooptic crystal, the distribution of refractive index with respect to the direction of y-axis is such that the refractive index is maximum at the middle portion and gradually decreases toward the end portions of y-axis. Owing to this particular gradient of refractive index on y-axis, the incident light is concentrated to the middle of the crystal. In other words, this crystal acts as a cylindrical lens with a power in the direction of y-axis with respect to the light polarized in the direction of z-axis. The focal length of this cylindrical lens can be changed by changing the voltage applied between the cylindrical electrodes.

FIG. 2 shows a two-dimensional composite lens formed according to the above-mentioned concept.

Designated by 6 and 8 in FIG. 2 are cylindrical lenses each formed of an electrooptic crystal. The cylindrical lenses 6 and 8 are different from each other with respect to the direction of axis along which the refractive index varies. Denoted by 7 is a halfwave plate for rotating only the polarization plane through 90 degrees without changing the pattern.

The above described variable-focal-length lens according to the prior art has, however, some drawbacks.

First, it is difficult to provide cylindrical electrodes in an electrooptic crystal as shown in FIG. 1. This involves a substantial cost.

Second, it is by means possible to make a lens having a negative power, that is, so-called concave lens.

Third, when a two-dimensional composite lens as shown in FIG. 2 is to be made, it is absolutely necessary to use a half wavelength plate, which is quite disadvantageous for a compact structure of a two-dimensional lens. Furthermore, it leads to increase in cost.

As another approach, a one-dimensional variable-focal-length lens using an electrooptic crystal is disclosed in "Experiments on light deflectors and variable-focal-length lenses by applying slanted electric field on electrooptic crystal" by M. Sakaguchi (Proceedings of the 1975 National Meeting of Japanese Electronic Communication Society, 864, 1975). This lens system is shown in FIG. 3.

Figure 3:
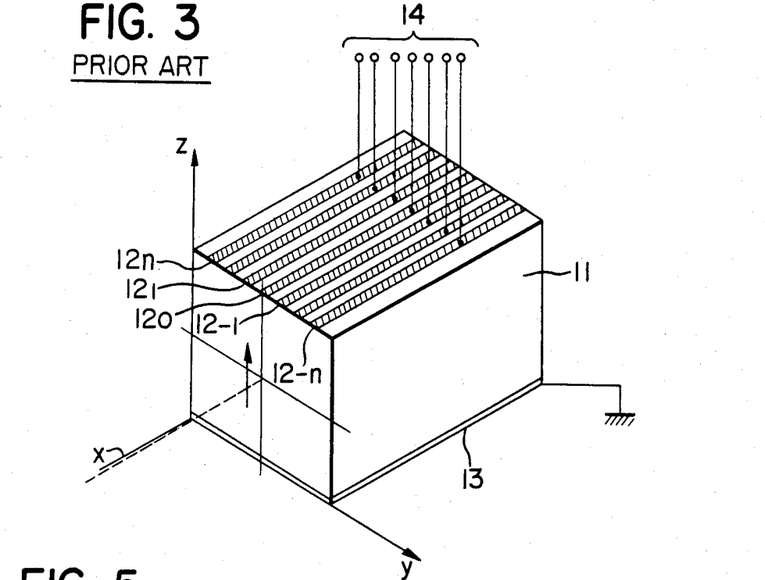
FIG. 3 is a perspective view of a one-dimensional variable-focal-length lens showing another example of the prior art wherein a slanted electric field is applied to an electrooptic crystal through slit electrodes.

Designated by 11 in FIG. 3 is an electrooptic crystal, LiTaO$_3$; and $12_{-n}, \ldots 12_0, 12_1, \ldots 12_n$ are slit-shaped electrodes. Denoted by 13 is a flat electrode, and by 14 is a lead wire. From the lead wire 14 there is applied to the crystal 11 an electric field approximated to a square distribution from middle to end, by the slit-shaped electrodes $12_{-n}, \ldots, 12_0, 12_1, \ldots 12_n$. Thus, such refractive index distribution is realized which has a lens action to the light polarized in the direction of z-axis. By changing the electric field to be applied there is obtained a one-dimensional lens of variable-focal-length. In the example shown in FIG. 3, the electrodes can be formed in a simple manner employing a well-known metal electrode forming process such as spattering. It has another advantage that a concave lens can be obtained only by reversing the distribution of the electric field applied to the slit-shaped electrodes.

However, the example shown in FIG. 3 is limited to a one-dimensional lens only, and could not be applied to a variable-focal-length lens having two-dimensional lens action.

SUMMARY OF THE INVENTION

Accordingly it is an object of the present invention to provide a variable-focal-length lens which is easy to manufacture and enables a two-dimensional lens action.

It is another object of the invention to provide a variable-focal-length lens which can act as a two-dimensional concave lens.

It is a further object of the invention to provide a variable-focal-length lens which is low in manufacturing cost and simple in structure.

In one aspect of the present invention, the above objects are attained by a combination of two one-dimensional variable-focal-length lenses, wherein each of the one-dimensional lens is obtained by applying to an electrooptic crystal an electric field having an intensity distribution varying along one direction in a plane normal to the direction of the incidence of the light on the crystal but having a uniform intensity distribution in the direction normal to the first mentioned direction, and wherein to obtain a two-dimensional lens action, these two one-dimensional variable-focal-length lenses are combined in such manner that the directions of their lens functions intersect each other at right angles.

In another aspect of the invention, a variable-focal-length lens is formed by applying to an electrooptic crystal a slanted electric field in the direction parallel to the direction of the incidence of the light thereby producing in the crystal a refractive index distribution which exhibits a two-dimensional lens action.

Other and further objects, features and advantages of the present invention will appear more fully from the following description of preferred embodiments taken in connection with the accompanying drawings.

DETAILED DESCRIPTION OF PREFERRED EMBODIMENTS

Figure 4:
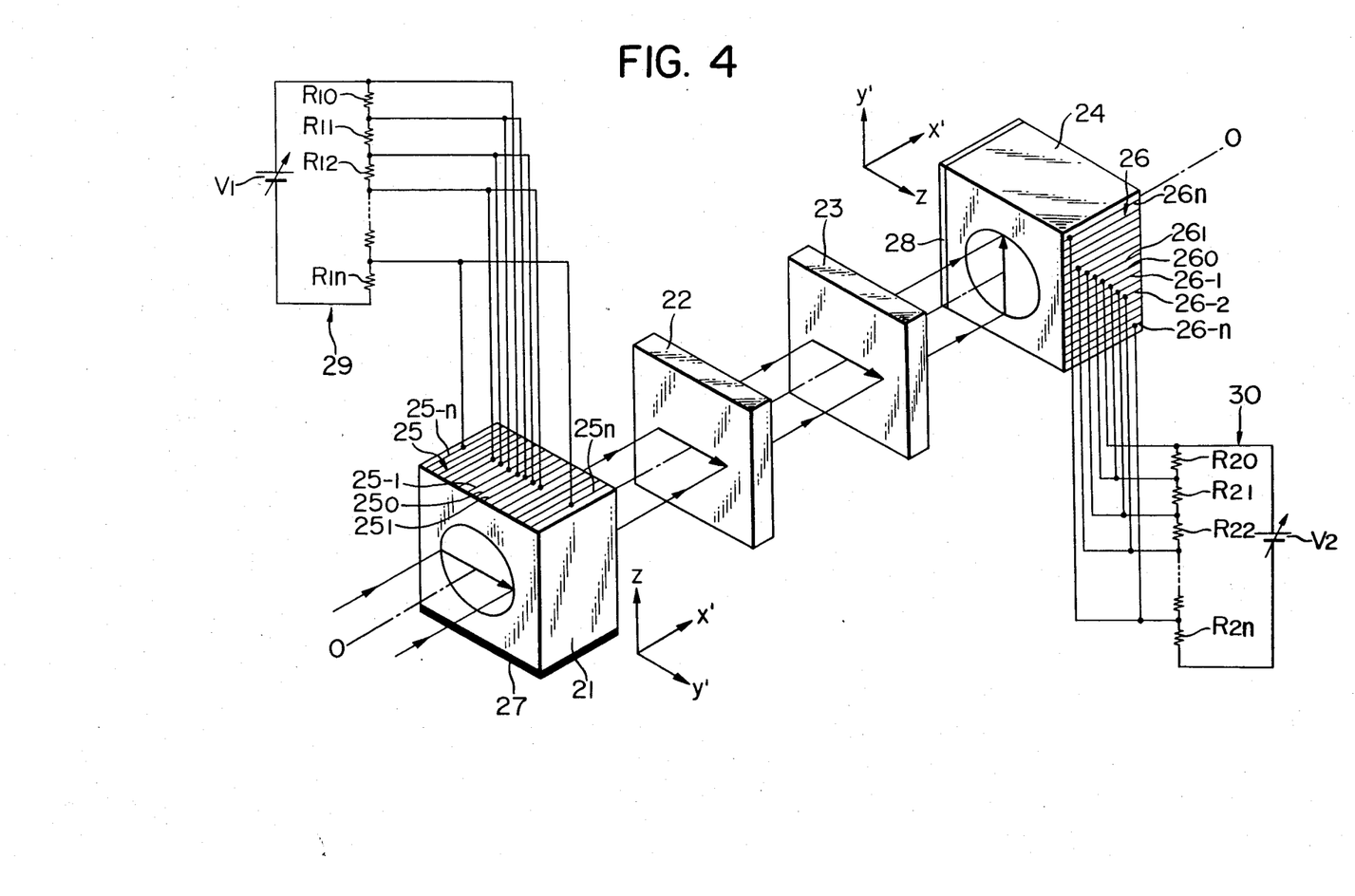
FIG. 4 is a perspective view of a two-dimensional variable-focal-length lens having two electrooptic crystals with slit electrodes according to a first embodiment of the present invention.

Referring to FIG. 4, a first embodiment of the invention will be described hereinafter.

In FIG. 4, the optical axis of the lens system is indicated by O—O. Arranged along the optical axis O—O are a first electrooptic crystal element 21, a polarizing plate 22, a rotating crystal plate 23 and a second electrooptic element 24 in this order. The first and second elements 21 and 24 are formed of the same material, KDP ($KH_2PO_4$). The rotating crystal plate 23 has a function for rotating the plane of polarization. The first and second electrooptic crystal elements 21 and 24 exhibit Pockels effect. Thus, the elements have the characteristics of double refraction in proportion to the electric field externally applied thereto. As is well-known in the art, the electrooptic element has an axis of rotatory inversion (referred to as z-axis) and two rotation axes (referred to as x-axis and y-axis). The coordinate axes as obtained by rotating x-axis and y-axis by 45 degrees about the z-axis are referred to as x'-axis and y'-axis respectively. The orientation of the first and second crystal elements 21 and 24 is determined in such manner that the x'-axis is coincident with the optical axis O—O. As seen from the crystal axes shown in FIG. 1, the first and second crystal elements 21 and 24 are disposed in such manner that z-axis of the first element 21 and y'-axis of the second element 24 are in the same direction and that y'-axis of the first element 21 and z-axis of the second element 24 are in the same direction. To the above two crystal elements 21 and 24 the electric field is applied in the direction of z-axis. To this end, each the crystal element 21, 24 has a grid electrode 25, 26 and a planar electrode 27, 28 cemented thereto. The grid electrode 25 on the first element 21 has a grid composed of a number of grid lines $25_{-n}, \ldots 25_{-1}, 25_0, 25_1, 25_2, \ldots 25_n$ arranged in the direction of x'-axis at the same pitch of grid spacings. Likewise, the grid electrode 26 on the second crystal element 24 has a grid of $26_{-n}, 26_{-1} 26_0, 26_1, 26_2, \ldots 26_n$. The grid electrodes 25 and 26 are connected to power source parts 29 and 30 respectively. The power source part 29 includes a variable voltage source $V_1$ and voltage dividing resistors $R_{10}, R_{11}, R_{12}, \ldots R_{1n}$ to apply to the respective grid members divided potentials in such manner as to give a square distribution of potential with the grid member $25_0$ being the center of the distribution. Likewise, the power source part 30 includes a variable voltage source $V_2$ and voltage dividing resistors $R_{20}, R_{21}, R_{22}, \ldots R_{2n}$ so as to give a square distribution of potential on the grid with the grid member $26_0$ being the center thereof.

The direction of polarization by the polarizing plate 22 is coincident with the direction of y-axis of the first crystal element 21. The rotating crystal plate 23 is such crystal having an optically rotating function by which the incident light is rotated by 90 degrees relative to the polarization direction.

When an external electric field Ez is applied to the above first and second crystal elements 21 and 24 along z-axis, there is formed in each the element an index ellipsoid which may be represented by:

$$\frac{x^2 + y^2}{n_o^2} + \frac{z^2}{n_e^2} + 2\gamma_{63}Ezxy = 1 \quad (1)$$

where $n_o$ is the principal refractive index in x and y directions;

$n_e$ is principal refractive index in z-direction; and $\gamma_{63}$ is Tensor component of electrooptic constant. If x-axis and y-axis are rotated by 45° to x'-axis and y'-axis while keeping z'=z, the coordinates $n_{x'}$ and $n_{y'}$ at which the index ellipsoid comes across x'-axis and y'-axis respectively are given by:

$$n_{x'} = n_o - \frac{n_o^3}{2} \gamma_{63}Ez \quad (2)$$

$$n_{y'} = n_o + \frac{n_o^3}{2} \gamma_{63}Ez \quad (3)$$

The light running in the direction of z=z'-axis through the crystal to which the above electric field is being applied in the z-direction, is allowed to be polarized only in the directions of x' and y' axes. The refractive indexes to the polarized lights in x'-direction and y'-direction are given as $n_{x'}$ and $n_{y'}$ by the above equations (2) and (3).

Therefore, to the polarized lights in x'-direction and y'-direction, the changes in refractive index $\Delta n_{x'}$ and $\Delta n_{y'}$ caused by the applied electric field Ez in z-direction are given by:

$$\Delta n_{x'} = -\frac{n_o^3}{2} \gamma_{63} E_z \qquad (4)$$

$$\Delta n_{y'} = +\frac{n_o^3}{2} \gamma_{63} E_z \qquad (5)$$

Since in the present embodiment, the light is polarized in the direction of y'-axis, the refractive index is given by the equation (6). The electric field is applied to the crystal elements 21 and 24 in the direction of z-axis and the electric field is distributed in the fashion of square distribution with the center being at $25_o$ of the grid electrode 25 and at $26_o$ of the grid electrode 26. Therefore, the refractive index $n_{y'}$ given by equation (3) is distributed in the fashion of square distribution with respect to the direction of y'-axis. It is well-known to those skilled in the art that such medium having a square distribution of refractive index acts as a lens. In the embodiment described above, therefore, the first and second electrooptic crystal elements 21 and 24 act as a cylindrical one-dimensional lens to the light running in the direction of x'-axis.

Of the light entering the first crystal element 21, the component polarized in y'-direction is subjected to the lens action in the direction of y'-axis and then incident on the polarizing plate 22. As the polarizing plate 22 is disposed in such manner that the direction of its polarization is the same as the direction of y'-axis of the first crystal element 21, only the light component subjected to the lens action can enter the rotating crystal plate 23. Since the rotating crystal plate 23 has an optically rotating function, it rotates the plane of polarization of the incident light by 90 degrees so that the light emerging from the crystal plate 23 has its polarization plane in the direction of y'-axis of the second crystal element 24. This light enters the second element. As previously described, x'-axis and y'-axis of the second element 24 are disposed rotated by 90 degrees relative to the first element 21 and act as a one-dimensional lens. It is obvious that a two-dimensional lens can be realized by a combination of two one-dimensional lenses intersecting each other at right angles with respect to the direction of lens action. Also, in this embodiment, the combination of the first and second crystal elements 21 and 24 is equivalent to such combination of two one-dimensional lenses. Therefore, as the composite effect of two crystal elements 21 and 24 there is obtained a two-dimensional lens. The focal length of the two-dimensional lens thus formed can be changed by changing the voltages of variable voltage sources $V_1$ and $V_2$ in the respective power source parts 29 and 30 thereby changing the refractive index $n_{y'}$ of the first and second electrooptic crystal elements 21 and 24. Further, it is possible to select any of positive lens action and negative lens action at will in a simple manner. That required therefor is to reverse the intensity distribution of the electric field applied to the electrodes 25 and 26 from convex distribution to concave distribution and vice versa.

For a linear electrooptic crystal element having Pockels effect showing double refraction proportional to the applied electric field as used in this embodiment, the requirement for the application of electric field by the grid electrodes 25 and 26 is only that the potential should be of square distribution. Therefore, other field application means than that shown in the above embodiment also may be used. If a quadratic electrooptic crystal element having Kerr effect is used which shows double refraction proportional to the square of the applied electric field, then it is possible to obtain the square distribution of refractive index without using such grid electrode having constant pitch. Also, the polarizing plate 22 may be positioned before or behind the first electrooptic crystal element 21. While the first embodiment has been shown to include a rotating crystal plate 23 for rotating the plane of polarization, the rotating crystal plate 23 may be omitted by selecting a suitable combination of the first and second crystal elements 21 and 24 so as to make the incident lights to the first element and to the second have the same direction of polarization. Such an arrangement which makes the rotating crystal plate unnecessary, is by no means possible according to the prior art as shown in FIG. 2. The disclosed embodiment of the present invention is the first one to make if possible.

Figure 5:
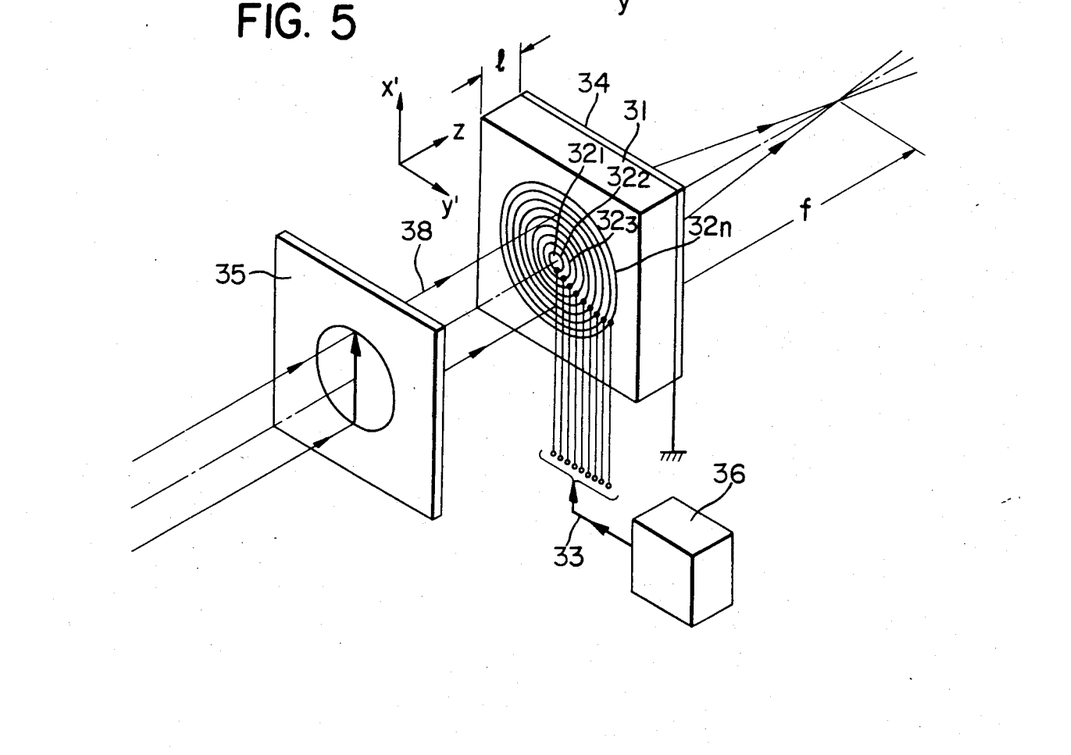
FIG. 5 is a perspective view showing a second embodiment of the invention wherein a slanted electric field is applied to an electrooptic crystal in the direction parallel to the direction of the incidence of the light to produce a two-dimensional lens action.

FIG. 5 shows a second embodiment of the invention.

In FIG. 5, designated by 31 is a crystal of $KH_2PO_4$ having a linear electrooptic effect (Pockels effect); 32 is a first transparent electrode part comprising a number of concentric ring transparent electrodes $32_1$, $32_2$ ... $32_n$; 33 is a lead wire; 34 is a second transparent electrode part which is planar; and 35 is a polarizing plate.

In this embodiment, z-axis is disposed parallel to the direction of light incidence and an electric field of such intensity distribution which varys within the plane normal to the light incidence direction is applied by the transparent electrodes. Likewise in the first embodiment, x' and y' in FIG. 5 indicate axes as obtained by rotating x-axis and y-axis of the electrooptic crystal by 45°. Also, for this second embodiment, the formed index ellipsoid is represented by the above formula (1) and the refractive index to the polarized light in x'-direction is given by the equation (2). In this embodiment shown in FIG. 5, the direction of polarization of the polarizing plate 35 is set to the direction of x'-axis and therefore the light 38 passing through the crystal is affected by the change of refractive index represented by the equation (4) with respect to the z-axis applied field $E_z$.

The thickness of the crystal in the direction of z-axis is constant and the first and second transparent electrode parts are provided on the surface of the crystal so as to form an electric field in the direction of z-axis according to the voltage applied to the electrode parts. Electrodes $32_1$, $32_2$ ... $32_n$ in the first transparent electrode part 32 have the same width and are shaped into rings which are concentric. They are arranged at the same pitch of spacings and electrically isolated from each other. Lead wires from the respective ring electrodes are connected to the power source part 36.

Figure 6:
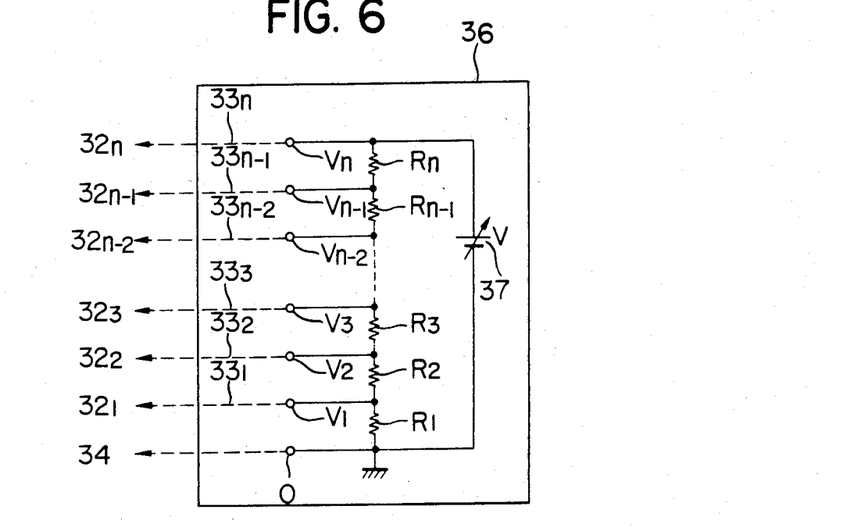
FIG. 6 is a fragmentary diagram showing the power source part for supplying a slanted electric field, in the second embodiment.

As shown in FIG. 6, the power source part 36 comprises a variable voltage source 37, series-connected resistors $R_1$, $R_2$ ... $R_n$ and lead-out wires $33_1$, $33_2$ ... $33_n$ extending from between the resistors. The resistance value of the m-th resistor $R_m$ is determined by the following arithmetical progression:

$$R_m = \frac{R}{2} + R(m - 1) \qquad (6)$$

where R is an optional constant.

The potential $V_m$ at the m-th lead-out wire $33_m$ is proportional to the voltage V of the variable power source and to $$\sum_{m}^{m} Rm.$$

From equation (6), $$\sum_{m}^{m} Rm \text{ is } \tfrac{1}{3} m^2 R.$$

Therefore, $$Vm \propto m^2 \cdot V \tag{7}$$

This potential Vm is applied to the ring transparent electrode 32m and an electric field proportional to Vm is applied to the ring area of the transparent electrode in z-direction of the crystal. Let r denote the distance radius from the center of the crystal. Then, it will be understood that m is proportional to r considering the above formulae (2) and (7). So, the refractive index distribution of the crystal 31 to the x' polarized beam 38 is given by:

$$n = n_o(1 - \tfrac{1}{2} Ar^2) \tag{8}$$

wherein, A is the function A(V) of the variable source voltage V. As is well-known in the art, the focal length of the lens having the refractive index distribution represented by the relation formula (8) is generally given by:

$$f = \frac{1}{n_o \sqrt{A} \sin(\sqrt{A}l)} \tag{9}$$

wherein, l is the thickness of the crystal 31 in z-axis direction.

As readily understood from the foregoing, the lens using an electrooptic crystal shown in this embodiment exhibits a converging lens action and its focal length can be changed easily and continuously by controlling the voltage V of the variable voltage source. Furthermore, according to the embodiment it is also possible to obtain a variable focal length lens having a diverging lens action by reversing the potential distribution.

The structures of electrode 32 and power source part 36 are never limited to those shown in FIGS. 5 and 6 only. Any other structure may be used providing that the desired square distribution of potential can be obtained therefrom. Also, other electrooptic crystal than $KH_2PO_4$ may be used in this embodiment. Even when there is used such crystal having quadratic electrooptic effect (Kerr effect), a lens effect similar to the above can be obtained by making the potential distribution proportional to the radius r. It is obvious that the polarizing plate 35 may be positioned before or behind the crystal 31.

As a modification of the second embodiment, a third embodiment of the invention will be described hereinafter.

The third embodiment is based on the realization that if the polarizing plate shown in the above second embodiment is so set as to make the polarization direction of the polarizing plate direct to the direction of y'-axis, then a diverging concave lens can be obtained using the same potential distribution. Of course, such concave lens is also included in the scope of the present invention.

According to the third embodiment based on the above realization, changeover of the sign of lens power from positive to negative and vice versa which was difficult to realize according to the prior art, can be attained instantly only by changing over the polarization direction of the polarizing plate.

More concretely, the third embodiment includes means for rotating the polarizing plate by 90° in addition to the elements shown in FIG. 5. Said rotating means may be conventional mechanical means or other known means useful for this purpose. By reversibly rotating the polarizing plate 90° by any integer, the polarization direction of the beam of light passing or transmitted through the crystal is changed over from convex lens action to concave one and vice versa. Even in case of the concave lens, its focal length changes continuously depending on the source voltage V.

Figure 7:
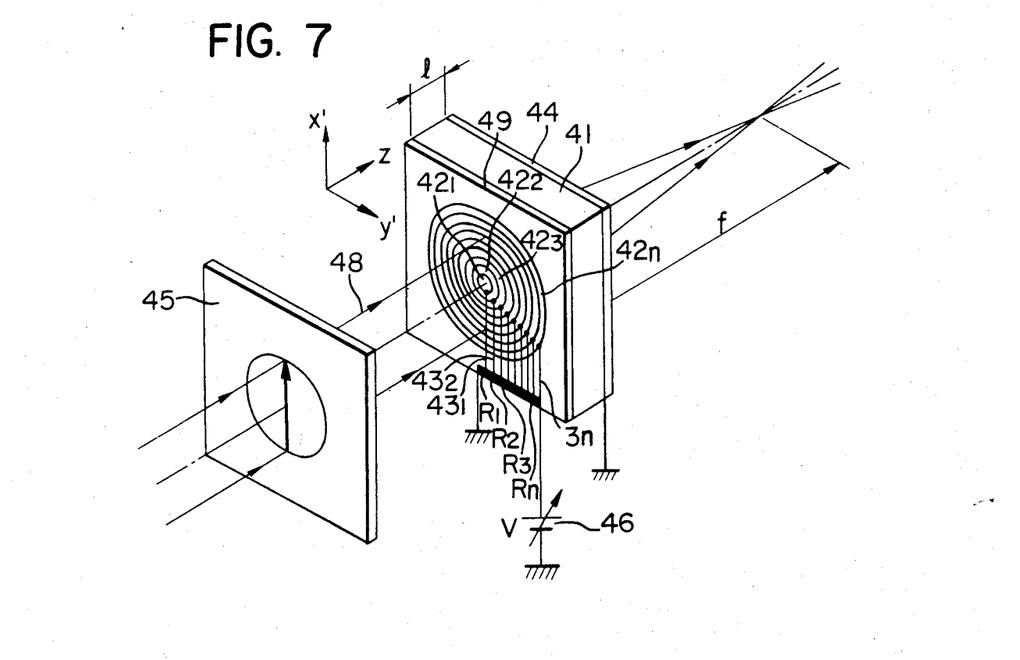
FIG. 7 is a perspective view showing a fourth embodiment of the invention wherein a transparent insulating layer is used to facilitate lead-out of lead wires.

FIG. 7 shows a fourth embodiment of the invention. This embodiment is directed to a concrete form of the lead-out wires and power source part in the second embodiment.

In FIG. 7, 41 is a crystal of $KH_2PO_4$ having a linear electrooptic effect (Pockels effect), 42 is a first transparent electrode part composed of a number of concentric ring transparent electrodes $42_1$, $42_2$ ... $42_n$, and $43_1$, $43_2$ ... $43_n$ are lead wires. Designated by 44 is a planar second transparent electrode part; 45 is a polarizing plate; 46 is a variable voltage source; 48 is an incident beam of light; and 49 is a transparent insulating layer. Like the second embodiment, also in this embodiment, a slanted electric field is applied by the concentric ring transparent electrodes $42_1$, $42_2$ ... $42_n$ to produce a converging lens action. The change of focal length is attained also by controlling the voltage V of the variable voltage source.

Figure 8:
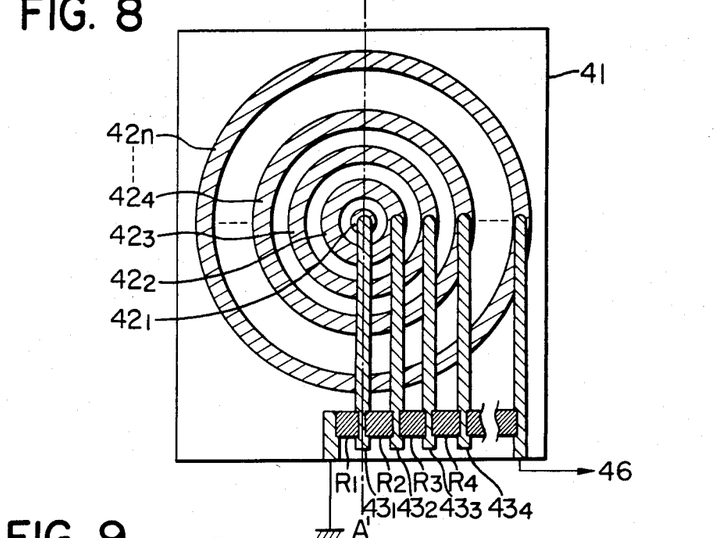
FIG. 8 is a view illustrating the electrodes on the surface of electrooptic crystal in the fourth embodiment.
Figure 9:
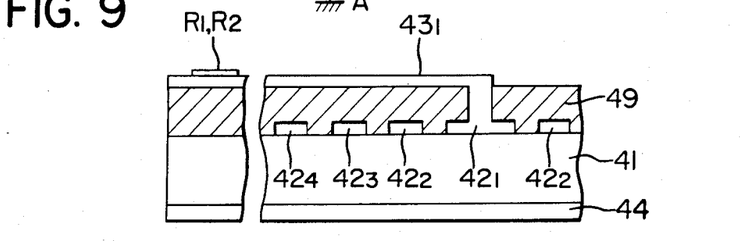
FIG. 9 is a cross-sectional view of the electrooptic crystal taken along the line A—A' in FIG. 8.

FIG. 8 is an enlarged plan view of the variable focal length lens shown in FIG. 7 and FIG. 9 is a sectional view thereof taken along the line A—A' in FIG. 8.

As seen from these figures, the ring transparent electrodes $42_1$, $42_2$ ... $42_n$ of the first electrode part 42 are arranged on a first surface of the electrooptic crystal 41. On a second surface opposed to the first surface of the crystal there is provided the planar second electrode part 44 covering the whole area of the second surface. The second transparent electrode 44 is grounded. In this embodiment, the first surface of the crystal on which the ring transparent electrodes are concentrically arranged, is covered with the transparent insulating layer 49. Lead wires $43_1$, $43_2$ ... $43_n$ are provided on the outer surface of the transparent insulating layer. These ring transparent electrodes and the corresponding lead wires are connected through holes formed passing through the layer. Only a pair of electrode $42_1$ and lead wire $43_1$ are shown in FIG. 9. All other pairs of ring electrode 42m and lead wire 43m are connected in the same manner.

In this embodiment, therefore, the ring transparent electrodes and the corresponding lead wires three-dimensionally intersect each other. This connecting method brings forth various advantages. The lead wires can be lead out very easily and can be connected to the concentric ring transparent electrodes in a simple manner. Generally the electric field attributable to lead wires disturbs the ideal axial symmetric distribution of electric field. However, in this embodiment, the intensity of electric field within the crystal and attributable to the lead wires is reduced to the extent corresponding to the thickness of the insulating layer. Therefore, the disturbance of the distribution of electric field caused by the lead wires becomes lessened to the extent. This is another advantage of the embodiment. By providing the insulating layer, the electrode mounting surface is shifted from the lead wire mounting surface. This has a particular advantage that undesirable contact and interference between lead wire and electrode and/or between lead wire and lead wire can be prevented completely for any pattern of the electrode arrangement.

As shown in FIG. 8, this embodiment includes thin film resistors $R_1, R_2 \ldots R_n$ provided between every two lead wires on the surface facing lead wires of the transparent insulating layer. The width and thickness of these thin film resistors are so selected as to have resistance values as represented by the above formula (6) and as used in the second embodiment. In this manner, in this embodiment, the resistors are incorporated into the lens itself. Therefore, a very compact construction can be realized by this embodiment.

While the embodiment has been described particularly in connection with the case of axial symmetric field distribution, it is to be understood that this embodiment may be applicable to any other electrode patterns. Also, as the electrode 42 and the power source 46 there may be used other arrangements than those shown in FIG. 7. The thing necessary is to produce a square distribution of potential. Further, it is to be understood that electrooptic crystals other than $KH_2PO_4$ may be used in the light of above teachings. Even when there is used such crystal having a quadratic electrooptical effect (Kerr effect) a good lens effect equivalent to the above may be obtained by making the potential distribution proportional to the radius r. It is obvious that the polarizing plate 45 may be positioned before the crystal 41 or behind it.

Figure 10:
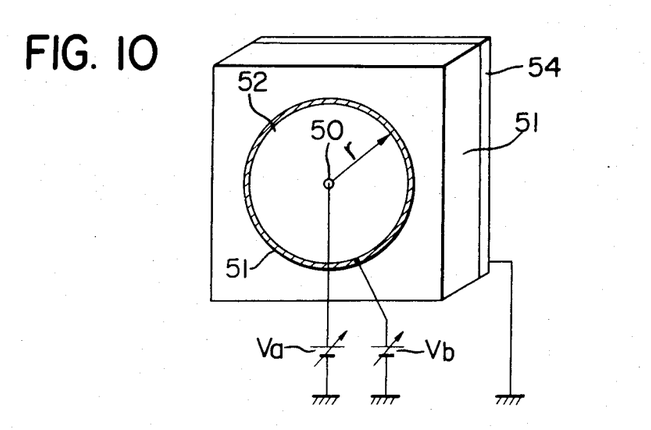
FIG. 10 is a perspective view showing a fifth embodiment of the invention wherein as the slanted field applying means there is used a continuous coating of transparent electroconductive material applied on the surface of electrooptic crystal.

FIG. 10 shows a fifth embodiment of the invention.

This fifth embodiment is featured by a continuous layer of electroconductive substance 52 between an inner electrode 50 and an outer ring electrode 51. The inner electrode 50 provided on the crystal surface lies on the optical axis of the incident light. The outer ring electrode 51 is radially spaced from the inner electrode. A distance of r from the inner electrode 50, the ring area of the conductive layer has a width dr corresponding to the radial distance r. The thickness and density of every ring area of dr in width is preset in such manner that the conduction resistance of the ring area is proportional to the radial distance r. Therefore, when a determined voltage is applied to the area between the two electrodes 50 and 51, the crystal acts as a lens because the potential at every point on the conductive layer is proportional to the square of r.

As the potential distribution, that is, the field distribution continuously changes in this embodiment, it provides very good lens performance.

The present invention as has been described with reference to the above embodiments has many advantages over the prior art. As compared with the conventional two-dimensional variable-focal-length lens using an electrooptic crystal, that of the present invention is very easy to manufacture. Also, the present invention enables to obtain also a diverging lens action.

According to the second to fifth embodiments of the invention, the two-dimensional lens action can be obtained using only one electrooptic crystal. This makes it possible to realize a very compact construction as compared with the conventional two-dimensional variable-focal-length lens and also with the first embodiment of the invention.

Further, the second to fifth embodiments are advantageous in particular in making a large aperture lens using electrooptic crystal. In the conventional variable-focal-length lenses using electrooptic crystal and also in the first embodiment of the invention, the electric field has been applied in the direction normal to the direction of incident light. If the surface on which the light is incident is increased, then the spacing between electrodes becomes broadened so that a higher voltage is required to obtain a sufficiently high intensity of electric field. In contrast, in the second to fifth embodiments, the electric field is applied in the same direction as the direction of incident light. Therefore, the surface of incidence can be increased without any adverse effect on the intensity of electric field and a large aperture lens can be realized without any problem. Since the application of the slanted electric field to the crystal in the direction parallel to the direction of incident light has such an important advantage, it becomes advantageous not only in forming two-dimensional lenses as shown in the above embodiment but also in forming one-dimensional variable-focal-length lenses. A composite two-dimensional lens also may be obtained by combining two such one-dimensional lenses in such manner that they intersect each other at right angles with respect to the direction of lens action. Therefore, it is to be understood that one-dimensional variable-focal-length lenses obtained by applying an electric field in the direction parallel to the direction of incident light as well as two-dimensional composite lenses obtained by a combination thereof are also included in the scope of the present invention.

What I claim is:

1. A variable-focal-length lens using an electrooptic effect for focusing incident light comprising:
   a first one-dimensional lens including an electrooptic crystal and means for applying to said electrooptic crystal an electric field having an intensity distribution varying along one direction in a plane perpendicular to the direction of light incidence but uniform in the direction normal to said one direction to produce a distribution of refractive index exhibiting a one-dimensional lens action;
   a second one-dimensional lens having the same structure as said first one and disposed in such manner that the direction of lens action of said second lens intersects that of said first one at right angles; and
   means for changing the electric field applied to said first and second one-dimensional lenses to change the focal length of the lens action.

2. A variable-focal-length lens as set forth in claim 1 wherein said electric field is applied to said electrooptic crystal in the direction normal to the direction of light incidence through a plural number of slit-shaped electrodes provided on a surface of said crystal normal to the plane of light incidence.

3. A variable-focal-length lens as set forth in claim 1, further comprising means for rotating the direction of polarization by 90°, said means being disposed between said first and second one-dimensional lenses.

4. A variable-focal-length lens using an electrooptic effect for focusing incident light comprising:
   an electrooptic crystal;
   first means for applying to said electrooptic crystal an electric field having an intensity distribution which varies within a plane normal to the direction of light incidence, in the direction parallel to said incident direction to produce a distribution of refractive index exhibiting a lens action in said electrooptical crystal; and second means for changing the electric field to be applied to change the focal length of the lens action.

5. A variable-focal-length lens as set forth in claim 4 wherein said first means includes a plural number of ring electrodes provided on a surface normal to the direction of incident light.

6. A variable-focal-length lens as set forth in claim 4 wherein said first means includes a transparent coating of electroconductive material continuously applied to said surface normal to the incident direction.

7. A variable-focal-length lens as set forth in claim 1 or 4, further comprising polarizing means disposed in the optical path of the light.

8. A variable-focal-length lens using an electrooptic effect for focusing incident light comprising:
an electrooptic crystal;
first means for applying said electrooptic crystal an electric field having an intensity distribution which varys within a plane normal to the direction of light incidence, in the direction parallel to said incident direction to produce a distribution of refractive index exhibiting a lens action in said electrooptic crystal;
second means for changing the electric field to be applied to change the focal length of said lens action;
polarizing means disposed in the optical path; and
means for rotating the direction of polarization of said polarizing means.

9. A variable-focal-length lens using an electrooptic effect for focusing incident light comprising:
an electrooptic crystal;
a plural number of ring electrodes provided on the surface of said electrooptic crystal;
a transparent insulating layer covering said electrodes;
a plural number of lead wires provided on a surface of said transparent insulating layer opposite to said ring electrodes and connected with said ring electrodes through pass-through holes formed in said layer; and
a power source part for applying to said lead wires a variable voltage to produce in said crystal an electric field distribution within the plane normal to the direction of incident light.

10. A variable-focal-length lens as set forth in claim 9 wherein said power source part is constituted of a variable voltage source and a plural number of parallel-connected resistors between said lead wires on the surface at the lead wire side of said transparent insulating layer.

* * * * *